United States Patent [19]
Goossen et al.

[11] 3,983,287
[45] Sept. 28, 1976

[54] COMPRESSIBLE PRINTING BLANKET

[75] Inventors: Charles G. Goossen, Hudson, Wis.; Stanley G. Peterson, Minneapolis, Minn.

[73] Assignee: Minnesota Mining and Manufacturing Company, St. Paul, Minn.

[22] Filed: Nov. 22, 1971

[21] Appl. No.: 200,729

[52] U.S. Cl. ............................. 428/241; 156/77; 156/297; 428/246; 428/261; 428/308; 428/320; 428/325; 428/423; 428/909
[51] Int. Cl.² .................................... B41N 9/00
[58] Field of Search ............... 161/DIG. 5, 88, 151, 161/158, 161, 162, 165, 190, 202, 221, 222, 240, 401, 92, 93, 402, 160; 156/145, 146, 297, 77; 428/241, 246, 261, 308, 320, 325, 423, 909

[56] References Cited
UNITED STATES PATENTS

| | | | |
|---|---|---|---|
| 1,778,185 | 10/1930 | Devries | 161/401 |
| 2,099,024 | 11/1937 | Lewis | 161/401 |
| 2,792,322 | 5/1957 | Fredericks | 161/401 |
| 3,046,172 | 7/1962 | Reid | 161/160 |
| 3,285,799 | 11/1966 | Peterson | 161/402 |
| 3,338,163 | 8/1967 | Demaria et al. | 161/88 |
| 3,515,625 | 6/1970 | Sedlak et al. | 161/168 |
| 3,700,541 | 10/1972 | Shrimpton et al. | 161/DIG. 5 |

*Primary Examiner*—James J. Bell
*Attorney, Agent, or Firm*—Alexander

[57] ABSTRACT

A printing blanket especially suited for use in offset lithography is provided by permanently laminating together an oil-resistant continuous rubber ink transfer layer, a strong thin tough synthetic foundation sheet, and a layer of incompressible elastomer having dispersed and bonded therein numerous minute frangible rigid-walled bubbles that have been broken uniformly throughout the elastomer layer to make it compressible.

3 Claims, 1 Drawing Figure

U.S. Patent  Sept. 28, 1976  3,983,287
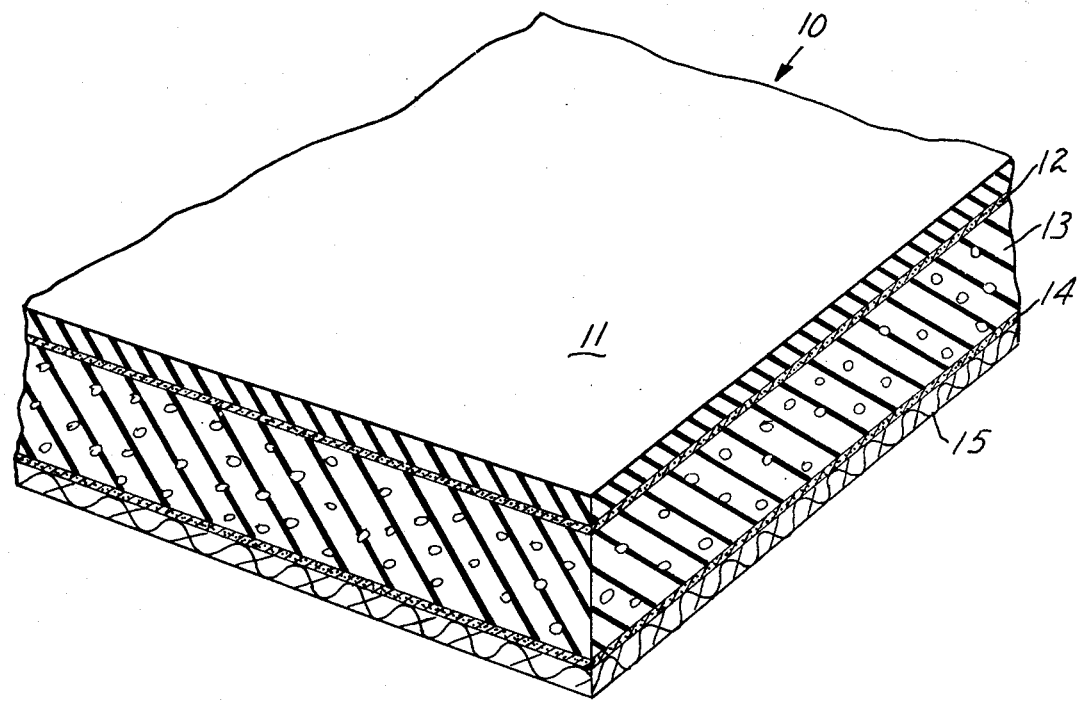
INVENTORS
CHARLES G. GOOSSEN
STANLEY G. PETERSON
BY Kinney, Alexander,
Sell, Steldt & DeLaHunt
ATTORNEYS

COMPRESSIBLE PRINTING BLANKET

This invention relates to cylinder covers for printing presses such as are used in lithographic offset printing.

In offset lithography a rotary cylinder is covered with a printing plate which normally has a positive image area receptive to oil-based inks and repellent to water and a background area receptive to water and repellent to ink. The plate is then rotated so that the surface of the plate contacts a second cylinder covered with a rubber-surfaced ink-receptive printing blanket. The ink present on the image area of the plate transfers, or offsets, to the surface of the blanket. Paper or other sheet stock to be printed in then passed between the blanket-covered cylinder and a rigid backup cylinder thereby again transferring the ink from the printing blanket to the paper.

During both the step in which the image is transferred from the plate to the blanket and the step where the image is transferred from the printing blanket to the paper, it is important to have intimate contact between the two contacting surfaces. This is ordinarily achieved by positioning the blanket-covered cylinder and the supporting cylinder it contacts so that there is a fixed "interference," i.e., so that the printing blanket is compressed throughout the run to a fixed depth, e.g., of about 3 mils, to produce a uniformly constant compression of the printing blanket against the paper being printed. It is important that this compression be maintained and that the surface of the printing blanket remain uniform, else the resulting printed paper will not be uniform and legible. Conventional blankets tend to compress gradually in use, necessitating frequent readjustment of the press settings to prevent "fade-out." A blanket which has been used to print envelopes often compresses in this manner and cannot thereafter be used to print paper which is wider than the envelopes; "ghosts" of the envelope appear on the sheets. It also occasionally happens that paper shreds or wrinkled or folded sheets are inadvertently fed through the press, thus compressing a portion of the printing blanket beyond its usual depth and causing localized absence of printing. Even more serious, misfeeds may occur in which extra sheets of paper cause a severe compression of a major portion of the printing. If permanent compression, or "set," results from such accidents, adjustments to the equipment--or even replacement of the blanket--must be made to avoid irregular or totally unsatisfactory printing.

For many years, conventional printing blankets have been made by laminating together several plies of fine grade cotton cloth and applying a printing surface of approximately 20 mils of oil-resistant rubber. Rubber is resilient but essentially incompressible; i.e., under severe load it maintains a constant volume by distorting sideways. Thus, in the event of a misfeed in offset lithography, a conventional printing blanket necessarily decreases in thickness primarily by permanently compressing the cotton cloth. Repair of the printing blanket in such event involves swelling the rubber printing surface with solvent, meticulously inserting sheets of paper beneath the blanket in the compressed areas, etc; these repairs are, at best, hard and slow to perform. Further even ordinary printing runs tend to impart a significant degree of permanent "set" to these blankets and thus reduce their effective life.

Various attempts have been made to produce improved lithographic printing blankets but they have not achieved complete success because they produced blankets which were impractical, expensive, unyielding, subject to compression set, or otherwise unsatisfactory. Two types of printing blankets that are of current commercial importance include a blanket having high void-volume sponge rubber compressible layer and a blanket comprising an elastomer-impregnated felted web (see, e.g., U.S. Pat. No. 3,147,698). They can be discussed together since they have similar characteristics and deficiencies. Both types of blankets have a "low-modulus" compressibility, which means that most of their compression occurs at low pressure necessitating "overpacking", i.e., printing with higher than normal interference between the printing blanket and the cylinder it contacts, to acheive adequate printing pressure. Overpacking reduces the amount of compression available at high pressure. Additionally, due to their high void volume and poor elastomeric properties, these constructions have a high degree of compression set and low shear strength. A third type of printing blanket, shown in U. S. Pat. No. 3,285,799, has an embossed elastomeric backing as a compressible layer. Although that blanket, has achieved great commercial success and functions adequately under normal conditions, it will print the embossed pattern under extreme conditions. Although mention is made in the patent of using a low void volume foamed rubber compressible layer rather than the embossed compressible, no suggestion is made regarding the preparation of such a heretofore difficult to prepare foam.

The present invention provides a novel printing blanket which maintains sharp images for long periods of use in offset lithography without significant wear, which is strong yet flexible and conformable, which can be temporarily compressed to a substantial extent, but which is highly resistant to permanent damage. This blanket requires no break-in period, does not "fade" in use, and will not print undesirable patterns under extreme conditions. The pressman is able to alternate thick and thin stock of varying width without even resetting the press.

The invention involves forming a layered structure comprised of an oil-resistant continuous rubber ink transfer layer, a strong thin synthetic foundation sheet, and a resilient compressible support layer of incompressible elastomer having dispersed and bonded therein a vast number of minute frangible rigid-walled bubbles that have been broken uniformly throughout the layer to impart compressibility. The minute bubbles are selected so that they have sufficient wall strength to withstand processing during formation of the elastomer layer, yet they are fragile enough to permit rupturing during the breaking operation. After the bubbles are ruptured, the elastomeric layer resembles a low void volume closed-cell foam which provides a smooth surface having no interstices in which ink can be retained, unlike open-cell compressible layers, which have such interstices.

The attached drawing is a perspective view in section of a printing blanket made according to the invention.

In the drawing, printing blanket 10 comprises an ink transfer layer 11 adhered by adhesive layer 12 to resilient compressible support layer 13, which in turn is adherently bonded to synthetic cloth foundation sheet 15 by adhesive layer 14. Adhesive layer 12 can be omitted by using a compostion for the ink transfer layer that will in some stage of processing form a permanent adherent bond with the adjacent layer.

The compressibility of the resilient support layer 13 is very important, since almost all of the compression which occurs will take place in this layer. If the structure does not compress at least 1 mil under a loading of 100 psi (typical printing pressure), it will not conform well to the plate cylinder or to the work being printed. On the other hand, if the compression under this loading exceeds 5 mils, it is exceedingly difficult to set the press accurately. The structure should compress at least an additional 4 mils when the loading is increased from 100 psi to 1000 psi in order to avoid permanently deforming the blanket when a misfeed occurs. Additionally, the structure should not retain a set of more than about 2 mils when the pressure is decreased from 1000 psi back to 100 psi.

The compressible resilient support layer should be made of an elastomer having a Shore A-2 hardness value of at least 60 and preferably about 75 to 90. If the support layer is significantly softer than this range, it will be impossible to obtain the additional 4 mils compression when loading is increased from 100 to 1000 psi without obtaining more than 5 mils compression between 0 and 100 psi.

The compressible support layer should contain at least about $5 \times 10^{-3}$ cubic inches of void per square inch of blanket surface, but the total void volume should not exceed 40 percent of the support layer. If the void volume is less than $5 \times 10^{-3}$ cubic inches per square inch, it will be impossible to obtain the necessary total compression at 1000 psi. If the void volume exceeds about 40 percent, it will be impossible to obtain the additional 4 mils compression when loading is increased from 100 to 1000 psi without obtaining more than 5 mils compression between 0 and 100 psi. Also, with void volumes higher than about 40 percent, the compressible support layer becomes physically weak and is subject to undesirable "set" after compression.

The exact thickness of the support layer can vary within the range of 15 to 100 mils, but is preferably 20 to 60 mils. Almost all the compression which occurs will take place in this layer, and if the thickness is less than 15 mils, it will be almost impossible to secure the 5 mils compression in this layer alone.

A critical feature of this invention is that the voids in the resilient support layer of the blanket are provided by a vast number of minute frangible rigid-walled bubbles. The most preferred rigid-walled frangible bubbles for this are sperical, but bubbles having other shapes, e.g., tubular or pear shape, are also useful. Bubbles of glass and phenolic resin have been found to give excellent results.

Although the size of the rigid-walled frangible bubbles may vary over a wide range, it is generally preferred to employ bubbles having a size of at least 10 microns up to about 300 microns in diameter; since bubbles within the range of 20 to 150 microns are readily available, they are most frequently employed in practicing the invention. The wall thicknesses of the bubbles may vary; but generally should not exceed about 15 percent of the size of the bubble in terms of diameter. Bubbles of different diameters will have different crushing resitances; therefore, it may be desired, for convenience in processing, to employ bubbles within a narrow diameter range, e.g. between about 40 and 100 microns in diameter.

To prevent the rigid-walled bubbles from being crushed in processing, they should be capable of withstanding collapse under a continuous hydrostatic pressure of at least about 200 psi, preferably at least about 300 psi. A mass of bubbles is considered to withstand such pressures if no more than about 10 percent of the original volume of the bubbles is collapsed under such pressure.

At a pressure of 2000 psi substantially all of the rigid-walled frangible bubbles are collapsed. Any bubbles remaining unbroken in the resilient support layer will thereafter remain as filler. It is the individual bubbles which collapse to satisfy the forgoing requirements, and it should be recognized that a bubble collapse in terms of percentage of original volume cannot reach 100 percent because some of the original volume of the frangible bubbles is accounted for by wall thickness. Thus even after collapse of all the frangible bubbles, the volume still occupied by the fragments of the crushed bubbles is such that the highest percentage volume attainable is about 90 percent of the total bubble volume.

In the structure of the printing blanket of the invention is included a strong thin tough kink-resistant low-stretch synthetic foundation sheet. As is shown in the drawing, the foundation sheet is adherently bonded to the resislient compressible layer on the side opposite of the oil-resistant continuous rubber ink transfer layer, to minimize distortion under high compression and packing creeping. Alternatively, the foundation sheet can be sandwiched between the ink transfer layer and the compressible layer and still provide a suitable inking blanket. The foundation sheet is preferably formed of a strong low-stretch fabric such as glass or saponified cellulose acetate (e.g., "Fortisan") unified by adhesive, although sheets of tough flexible materials such as metal or plastics (e.g., a biaxially oriented polyethylene terephthalate film) are also useful.

The printing blanket may be conveniently mounted on a surface, e.g., of a printing roll, by applying adhesive to the non-inking surface of the blanket, i.e., the surface opposite the exposed surface of the ink transfer layer. For this purpose it has been found convenient to utilize a layer of normally tacky pressure sensitive adhesive such as that disclosed in U.S. Reissue Pat. No. 24,906.

The following detailed examples are offered to further illustrate but not limit the invention. All parts are by weight unless otherwise specified.

EXAMPLE 1

A printing blanket having a polyurethane resilient layer made of the ingredients shown below is prepared according to the description that follows:

| Ingredients | Parts |
| --- | --- |
| Polyurethane - Part A | |
| Poly oxypropylene glycol (MW 2000) | 1141 |
| Finely divided silica ("Cab-O-Sil") | 51 |
| Lead monoxide initiator | 3 |
| Methylene bis-orthochloroaniline | 141 |
| Calcium octoate initiator | 5 |
| Phenyl mercuric acetate initiator | 3 |
| Polyurethane - Part B | |
| Tolyene diisocyanate | 326 |
| Dipropylene glycol | 74 |
| Frangible bubbles | |
| Hollow glass bubbles (0.216 g/cc average particle density, 2.5 g/cc glass density, 70 mm average particle diameter) | 145 |

If 10 parts A is mixed with 3 parts B and cured by heating the mixture at 52°C. for 1 hour and then at 80°C. for an additional 4 hours, a tough bubble-free elastomer having the following physical properties is obtained:

| | |
|---|---|
| Shore A-2 hardness | 83 |
| Density | 1.12 g/cc |
| Tensile | 1800 psi |
| Tear | 400 pli |
| Ultimate elongation | 300% |

In the practice of the invention, the glass bubbles are intimately mixed with the A ingredients in an evacuated vessel to form a slurry. The vacuum is released and the B ingredients are then added with mixing. The resultant combination is knife-coated at a wet thickness of 60 mils on a silicone-coated paper release liner. The coating is cured by heating to provide a self-supporting 40 mil thick polyurethane bubble layer having a theoretical bubble volume of about 30 percent. The liner is stripped away and the layer is ground with a grinding device having a rotatable drum covered with abrasive to provide a uniform surface and thickness of about 40 mils. The bubbles are then crushed by passing the layer between rolls of a rubber mill that are spaced apart to provide an opening of 18 mils, producing a compressible polyurethane layer having a thickness of about 36 mils.

A foundation sheet is prepared by knife-coating, through an orifice of about 14 mils, a 10 mil thick crowfoot weave continuous filament "Fortisan" saponified cellulose acetate rayon fabric weighing about 5 ounces per square yard, with a solution consisting of 10 parts A ingredients and 3 parts B ingredients, and stacking together two layers of the coated fabric. The foundation sheet is adhered to one surface of the compressible polyurethane layer to form a laminate by pressing the layers together while the coating solution of the fabric is fluid, and curing by heating at 52°C. for 4 hours. The exposed polyurethane layer surface is then ground to provide a uniform thickness of 56 mils.

A printing blanket is provided by coating the laminate on its freshly ground surface with a liquid composition comprised of the following ingredients to provide a dried oil resistant ink transfer layer 7 mils in thickness:

| Ingredients | Parts |
|---|---|
| Carboxy-modified acrylonitrile/butadiene copolymer having an acrylonitrile content of 32–34% ("Hycar 1072") | 100 |
| Finely-divided zinc oxide ("Goodrite 3300 × 2") | 5 |
| Finely-divided sulfur | 3 |
| calcined soft clay | 40 |
| Phthalocyanine blue pigment | 2 |
| Rutile titanium dioxide pigment | 4 |
| Dibutoxyethyl sebacate | 8 |
| Benzothiazyl disulfide | 3 |
| Tetramethylthiouram monosulfide | 0.5 |
| Methyl ethyl ketone solvent | 200 |

After initial drying by solvent evaporation in air, the surface of the rubbery layer is dusted with talc, overlaid with a matte-surfaced polyester film, and the resultant assembly is heated at about 95°C. under pressure for about 3 hours to provide, on removal of the polyester sheet, a printing blanket having a matte-surfaced oil-resistant ink transfer layer.

A compression of 1.5 mils resulted upon subjecting the finished printing blanket to a pressure of 100 psi, with an additional compression of 10.7 mils at 1000 psi, a "set" of 1.7 mils on return of the pressure to 100 psi. The compression values and the "set" were well within the desired limits as hereinbefore set forth.

The printing blanket, when used as a replacement cover for the inking roll of a "Davidson 500" offset press, performed in a superior manner with no undesirable pattern impression, giving good print quality with printing stock having a variety of thicknesses.

Useful inking blankets are made utilizing the compositions shown in the following Examples to produce various compressible elastomer layers, the oil-resistant ink transfer layer and the foundation sheet being the same as in Example 1.

EXAMPLE 2

| Ingredients | Parts by Weight |
|---|---|
| Chloroprene polymer ("Neoprene GRT") | 100 |
| Plasticizer (piperidinium pentamethylene dithiocarbamate) | 1 |
| Finely-divided magnesia | 4 |
| Antioxidant (65% N-phenyl-beta naphthylamine/35% N,N-prine-diphenyl p-phenylenediamine) | |
| Stearic acid | 1 |
| Carbon black (MT) | 120 |
| Aromatic petroleum process oil | 15 |
| Paraffin | 1 |
| Petroleum wax blend ("Heliozone") | 3 |
| Finely-divided zinc oxide | 5 |
| 2-mercaptoimidazoline (curing agent "NA-22") | 0.5 |

The above ingredients are pre-mixed on a heated (70°C.) rubber mill to form a blend. To 89 parts of the blend is added with continued mixing 12.8 parts hollow glass bubbles (average particle density 0.320 g/cc., glass density 2.5 g/cc, average particle size 40 microns).

The mixture is sheeted on the heated rubber mill, cured by heating at 135°C. for 2 hours to provide a sheet having a theoretical bubble volume of 40 percent, which sheet is ground to a thickness of about 0.040 inch, and passed through a rubber mill having an opening of 0.020 inch to break the bubbles. When this sheet is subjected to pressure, a compression of 3.2 mils is obtained at 100 psi, an additional compression of 6.5 mils is obtained at 1000 psi. A "set" of 1.7 mils results when the pressure is returned to 100 psi. The Shore A-2 hardness of the cured elastomer (without bubbles) is 67.

EXAMPLE 3

| Ingredients | Parts by Weight |
|---|---|
| Poly(Acrylonitrile/butadiene ("Hycar 1050") | 100 |
| Zinc oxide | 5 |
| Sulphur | 2 |
| Stearic acid | 1.5 |
| Carbon black (SRF) | 117 |
| Dibutoxyethyl sebacate | 21 |
| N-nitrosoethenylamine | 1.5 |
| Benzothiazyldisulfide | 1.6 |

| Ingredients | Parts by Weight |
|---|---|
| Tetramethylthiouram monosulfide | 0.3 |

The ingredients are pre-mixed on a hot rubber mill to form a blend. To 286 parts of the blend is added with continued mixing 28.8 parts of hollow glass bubbles (previously described in Example 2) to give a theoretical bubble content of 30 percent by volume. The mixture is sheeted to a caliper of about 0.042 inch, cured under light pressure for two hours at 135°C., and passed through an 0.011 inch opening of a rubber mill to break the bubbles, giving a compressible layer.

When this layer is subjected to pressure, a compression of 3.3 mils is obtained at 100 psi, an additional compression of 7.5 mils is obtained at 1000 psi, and a "set" of 1.1 mils results when the pressure is decreased from 1000 to 100 psi. The Shore A-2 hardness of the cured composition (without bubbles) is 72.

What is claimed is:

1. A thin strong printing blanket especially suited for use in offset llighography comprising in laminated combination:
    an intermediate compressible layer of about —40 mils thick comprised of polyurethane elastomer having up to about 40 percent uniformly distributed voids and at least $5\times10^{-3}$ cubic inches of void per square inch of blanket surface, said polyurethane elastomer having a Shore A-2 hardnes of 75–90 when void free, said voids characterized by having diameters in the range of 40 to 100 microns, a shape corresponding to minute spherical rigid-walled frangible glass bubbles, and containing the broken walls of said bubbles; and having permanently bonded to either major surface of said compressible layer;
    an ink transfer layer about 5 mils thick comprised of acrylonitrile/butadiene copolymer; and
    a foundation sheet about 20 mils thick comprised of at least one thickness of a strong woven fabric that has been integrated with an adhesive resin.

2. A thin strong printing blanket especially suited for use in offset lithography comprising in laminated combination:
    an intermediate compressible layer comprised of polyurethane elastomer having up to about 40 percent uniformly distritubed voids and at least $5\times10^{-3}$ cubic inches of void per square inch of blanket surface, said polyurethane elastomer having a Shore A-2 of 75–90 when void free, said voids characterized by having diameters in the range of 40 to 100 microns, a shape corresponding to minute spherical rigid-walled frangible glass bubbles, and containing the broken walls of said bubbles; and having permanently bonded to either major surface of said compressible layer;
    an ink transfer layer comprised of acrylonitrile/butadiene copolymer; and
    a foundation sheet comprised of at least one thickness of a strong woven fabric that has been integrated with an adhesive resin.

3. The printing blanket of claim 2 including a layer of pressure sensitive adhesive adherently bonded opposite the exposed surface of said ink transfer layer.

* * * * *